United States Patent
Artzer

[11] 3,857,574
[45] Dec. 31, 1974

[54] GASKET ASSEMBLY
[75] Inventor: Paul J. Artzer, Arvada, Colo.
[73] Assignee: Appleton Electric Company, Chicago, Ill.
[22] Filed: Oct. 10, 1973
[21] Appl. No.: 405,149

[52] U.S. Cl............ 277/183, 277/188, 277/235 R, 174/65 R
[51] Int. Cl............................................ F16j 15/12
[58] Field of Search .......................... 277/181–185, 277/188, 189, 212, 235, 9; 174/65 R, 65 SS; 85/1, 9, 50

[56] References Cited
UNITED STATES PATENTS

| | | | |
|---|---|---|---|
| 2,282,312 | 5/1942 | Halstead | 277/166 |
| 2,512,098 | 6/1950 | Gratzmuller | 277/166 |
| 2,533,137 | 12/1950 | Neale | 277/166 |
| 2,643,904 | 6/1953 | Wehmanen | 277/188 |
| 2,718,441 | 9/1955 | Smith | 277/212 F |
| 2,884,100 | 4/1959 | McKee | 277/166 |
| 2,982,573 | 5/1961 | McKee | 277/181 |
| 2,995,782 | 8/1961 | Heller | 277/166 |
| 3,038,456 | 6/1962 | Dreisin | 277/212 |
| 3,588,133 | 6/1971 | Caserta | 277/235 R |
| 3,670,618 | 6/1972 | Jellison | 277/166 |

Primary Examiner—Harry N. Haroian
Assistant Examiner—Robert I. Smith
Attorney, Agent, or Firm—Darbo, Robertson & Vandenburgh

[57] ABSTRACT

A gasket for electrical fittings comprises a metallic cup having a low flange about the periphery. An elastomeric washer of truncated conical configuration is positioned within the cup and has its outer wall bonded to the inner wall of the flange of the cup.

3 Claims, 8 Drawing Figures

PATENTED DEC 31 1974  3,857,574

3,857,574

GASKET ASSEMBLY

SUMMARY OF THE INVENTION

The present invention relates to a simple, yet sturdy and effective gasket particularly suited for electrical fittings and comprising a structure which makes it relatively simple and inexpensive to manufacture.

DESCRIPTION OF SPECIFIC EMBODIMENT

Figure 1:
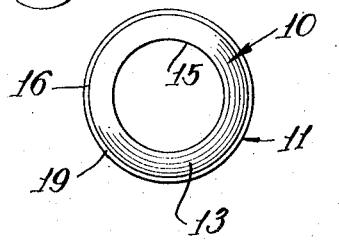
FIG. 1 is a plan view of a small gasket embodying the invention.

The following disclosure if offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The gasket of the present invention comprises an elastomeric washer, generally 10, secured in a cup-shaped metallic member, generally 11. These are bonded together with an adhesive as hereinafter described.

The washer 10 has an upper wall 13 and a lower wall 14. These are parallel to each other and have a truncated conical configuration. There is an inner wall 15 and an outer wall 16 which connect the upper and lower walls 13 and 14. The inner wall 15 is cylindrical with a relatively small radius and the outer wall 16 is likewise cylindrical about the same axis, but with a relatively larger radius. This elastomeric washer can be formed of a suitable natural or synthetic material, such as natural rubber, chloroprene rubber (e.g. that sold under the trademark Neoprene), etc.

The metallic member 11 has an annular base 18 about the periphery of which is an annular flange 19. This member is made of soft iron, for example, and is cadmium plated. The inner wall of the flange 19 is in immediate juxtaposition to the outer wall 16 of the elastomeric washer, the two being abutting with a thin layer 20 of adhesive between the two. For the purposes of manufacture (as described in my application filed concurrently herewith and entitled METHOD AND MACHINE FOR ASSEMBLING A GASKET ASSEMBLY, the disclosure of which is incorporated herein by reference) this adhesive is a thermoplastic adhesive. The outer wall 16 extends up a short distance above the top of flange 19.

Figure 4:
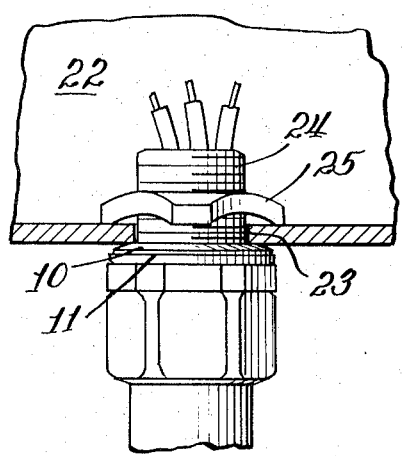
FIG. 4 is a section through an electrical box showing a fitting mounted thereon and using the gasket.
Figure 5:
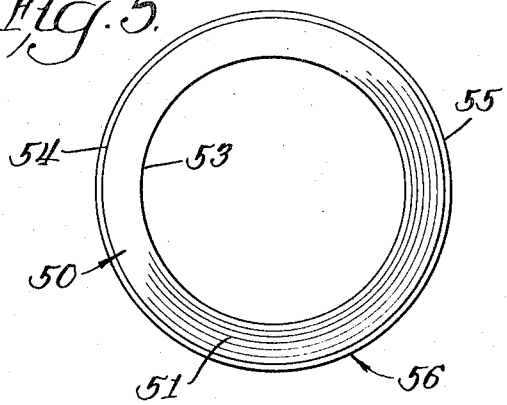
FIG. 5 is a plan view of a larger embodiment.
Figure 6:
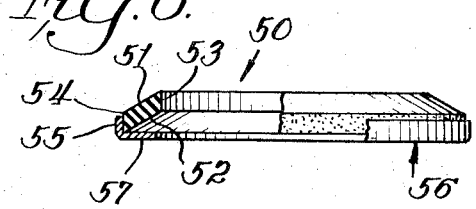
FIG. 6 is an elevational view of the embodiment of FIG. 5, partially broken away.
Figure 7:
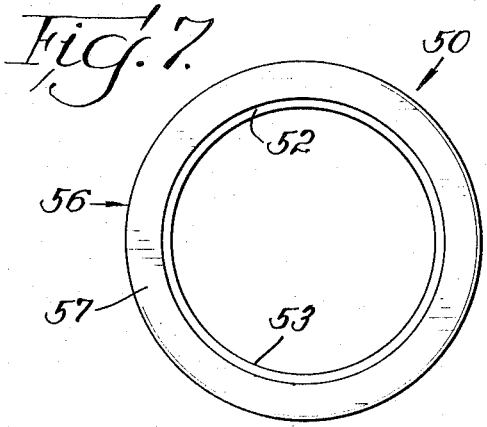
FIG. 7 is a bottom view.
Figure 8:
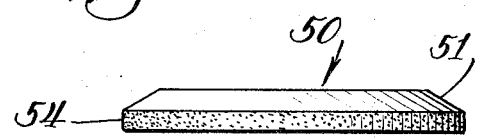
FIG. 8 is an elevational view of the elastomeric washer used in the embodiment of FIGS. 5–7.

FIG. 4 illustrates a segment of an electrical box 22 having an opening 23 in one wall thereof. An electrical fitting 24 extends through this opening and carries a nut 25 which is threaded onto the fitting to hold the fitting in place. Between the portion of the fitting 25 that is externally of the box and the wall of the box is one of my gaskets 10, 11. This provides a seal about the opening 23 in the box.

Figure 2:
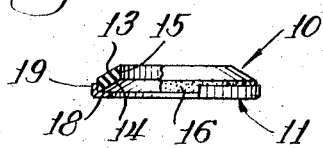
FIG. 2 is an elevational view, partially broken away.
Figure 3:
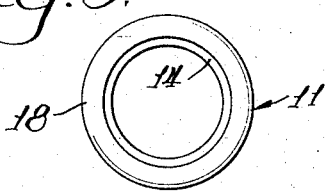
FIG. 3 is a bottom view.

FIGS. 5–8 illustrate a larger size seal incorporating the same features as that described with respect to FIGS. 1–3. Here there is an elastomeric washer, generally 50. It has upper and lower walls 51 and 52 and inner and outer walls 53 and 54. The outer wall 54 is bonded to the inner face of a flange 55 of a cup-shaped metallic member, generally 56. Member 56 has a base 57.

The configuration is such that the metallic member forms a protective support for the elastomeric washer, not only during the handling prior to assembly, but it prevents the elastomeric washer from being completely extruded out of the desired location by undue pressure. Within reasonable pressure limits, the washer will take the load, but when the load becomes too great it is impressed on the edges of the flanges 19, 55. The truncated conical configuration permits the elastomeric washer to seal with relatively light pressures and still have a substantial amount of give. The configuration is such that the parts can be inexpensively manufactured and assembled. Thus the elastomeric washers can be lathed cut from tubing already coated with adhesive. After being slipped into the metallic member the application of heat will result in bonding of the components.

I claim:

1. In the combination of electrical fitting means and a gasket between said fitting means, the improvement wherein said gasket comprises:

an annular, elastomeric member having parallel upper and lower walls, said walls being in the shape of a frustum of a cone, said walls being joined by inner and outer walls, said inner and outer walls being cylindrical in configuration with the inner wall having a smaller radius than that of the outer wall, said inner and outer walls having a common height;

a cup-shaped member having a generally flat annular base with an annular flange about the periphery of the base and at right angles to said base, said flange having an inside wall with a height above said base less than said common height, said cup-shaped member being relatively rigid compared to said elastomeric member, said elastomeric member being positioned within said cup-shaped member with said lower wall in juxtaposition to said base and with said outer wall of said elastomeric member in juxtaposition to said inside wall of said cup-shaped member; and an adhesive between the outer wall of the elastomeric member and the inside wall of said cup-shaped member and bonding the two together.

2. In the combination of claim 1, wherein said cup-shaped member is metallic and said adhesive is a thermoplastic adhesive.

3. A gasket comprising:

an annular, elastomeric member having parallel upper and lower walls, said walls being in the shape of a frustum of a cone, said walls being joined by inner and outer walls, said inner and outer walls being cylindrical in configuration with the inner wall having a smaller radius than that of the outer wall, said inner and outer walls having a common height;

a cup-shaped member having a generally flat annular base with an annular flange about the periphery of the base and at right angles to said base, said flange having an inside wall with a height above said base less than said common height, said cup-shaped member being relatively rigid compared to said elastomeric member, said elastomeric member being positioned within said cup-shaped member with said lower wall in juxtaposition to said base and with said outer wall of said elastomeric member in juxtaposition to said inside wall of said cup-shaped member; and an adhesive between the outer wall of the elastomeric member and the inside wall of said cup-shaped member and bonding the two together.

* * * * *